(12) United States Patent
Marras et al.

(10) Patent No.: US 12,488,436 B2
(45) Date of Patent: Dec. 2, 2025

(54) NOISE RECONSTRUCTION FOR IMAGE DENOISING

(71) Applicant: HUAWEI TECHNOLOGIES CO., LTD., Guangdong (CN)

(72) Inventors: Ioannis Marras, London (GB); Filippos Kokkinos, London (GB); Stamatios Lefkimmiatis, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 18/477,123

(22) Filed: Sep. 28, 2023

(65) Prior Publication Data
US 2024/0020796 A1  Jan. 18, 2024

Related U.S. Application Data

(63) Continuation of application No. PCT/EP2021/058622, filed on Apr. 1, 2021.

(51) Int. Cl.
*G06T 5/70* (2024.01)
*G06V 10/74* (2022.01)

(52) U.S. Cl.
CPC .............. *G06T 5/70* (2024.01); *G06V 10/761* (2022.01); *G06T 2207/20084* (2013.01); *G06T 2207/20182* (2013.01)

(58) Field of Classification Search
CPC ............. G06T 5/70; G06T 2207/20084; G06T 2207/20182; G06T 5/60; G06T 2207/20081; G06V 10/761
See application file for complete search history.

(56) References Cited

U.S. PATENT DOCUMENTS

| | | | |
|---|---|---|---|
| 2008/0151081 A1* | 6/2008 | Frank | H04N 25/67 348/241 |
| 2009/0021611 A1* | 1/2009 | Utsugi | H04N 25/67 348/241 |
| 2018/0253830 A1* | 9/2018 | Courtney | G06T 5/70 |
| 2021/0224964 A1* | 7/2021 | Narukiyo | H04N 1/6027 |

(Continued)

FOREIGN PATENT DOCUMENTS

| | | |
|---|---|---|
| CN | 101739671 A | 6/2010 |
| CN | 105164725 B | 3/2019 |

OTHER PUBLICATIONS

Guan et al., "Node: Extreme Low Light Raw Image Denoising using a Noise Decomposition Network," CoRR, submitted on Sep. 11, 2019, arxiv:1909.05249v1, 20 pages.

(Continued)

*Primary Examiner* — Gevell V Selby
(74) *Attorney, Agent, or Firm* — Fish & Richardson P.C.

(57) ABSTRACT

The present disclosure relates to method and apparatuses for denoising an image. One example method includes receiving an input image captured by an image sensor, implement a trained artificial intelligence model to form an estimate of a noise pattern in the input image, to form an estimate of at least one noise statistic for the image sensor, and to refine the estimate of the noise pattern based on the estimate of the at least one noise statistic, and form an output image by subtracting the refined estimate of the noise pattern from the input image.

20 Claims, 11 Drawing Sheets

(56) References Cited

U.S. PATENT DOCUMENTS

2021/0312593 A1* 10/2021 Okuno .................. G06N 3/045
2022/0036516 A1* 2/2022 Chen ..................... G06T 5/50

OTHER PUBLICATIONS

He et al., "Deep residual learning for image recognition," CoRR, submitted on Dec. 10, 2015, arXiv:1512.03385v1, 12 pages.

Ronneberger et al., "U-Net: Convolutional Networks for Biomedical Image Segmentation," CoRR, submitted on May 18, 2015, arxiv:1505.04597v1, 8 pages.

Marras et al., "Reconstructing the Noise Variance Manifold for Image Denoising," CoRR, submitted on Mar. 7, 2020, arXiv:2002.04147v2, 18 pages.

Zhang et al., "Beyond a Gaussian denoiser: Residual learning of deep CNN for image denoising," CoRR, submitted on Aug. 13, 2016, arXiv:1608.03981v1, 13 pages.

Chrysos et al., "Robust Conditional Generative Adversarial Networks," CoRR, submitted on Mar. 13, 2019, arXiv:1805.08657v2, 27 pages.

Anaya et al., "Renoir—A Dataset for Real Low-Light Image Noise Reduction," CoRR, submitted on May 8, 2017, arXiv:1409.8230v9, 27 pages.

Abdelhamed et al., "Ntire 2019 Challenge on Real Image Denoising: Methods and Results," Proceedings of IEEE Conference on Computer Vision and Pattern Recognition (CVPR) Workshops, Jun. 2019, 14 pages.

Abdelrahman et al., "Noise Flow: Noise Modeling with Conditional Normalizing Flows," Proceedings of the IEEE/CVF International Conference on Computer Vision 2019, Oct. 27-Nov. 2, 2019, 9 pages.

Plotz et al., "Benchmarking Denoising Algorithms with Real Photographs," CoRR, submitted on Jul. 5, 2017, arXiv:1707.01313v1, 19 pages.

Ioffe et al., "Batch normalization: Accelerating deep network training by reducing internal covariate shift," CoRR, submitted on Mar. 2, 2015, arXiv:1502.03167v3, 11 pages.

Gu et al., "Weighted nuclear norm minimization with application to image denoising." Proceedings of the 2014 IEEE Conference on Computer Vision and Pattern Recognition, Jun. 23, 2014, 8 pages.

Tai et al., "MemNet: A persistent memory network for image restoration," Proceedings of 2017 IEEE International Conference on Computer Vision (ICCV), Oct. 22-29, 2017, 9 pages.

Rudin et al., "Nonlinear total variation based noise removal algorithms," Physica D: nonlinear phenomena, Nov. 1, 1992, 60(1-4):259-268.

Mairal et al., "Non-local Sparse Models for Image Restoration," Proceedings of 2009 IEEE 12th International Conference on Computer Vision, Sep. 29, 2009, 8 pages.

Mirza et al., "Conditional Generative Adversarial Nets," CoRR, submitted on Nov. 6, 2014, arXiv:1411.1784v1, 7 pages.

Gu et al., "A Brief Review of Image Denoising Algorithms and Beyond," The Springer Series on Challenges in Machine Learning, 2019, 21 pages.

Lehtinen et al., "Noise2Noise: Learning Image Restoration without Clean Data," CoRR, submitted on Oct. 29, 2018, arXiv:1803.04189v3, 12 pages.

Marras et al., "Reconstructing the Noise Manifold for Image Denoising," CoRR, submitted on Mar. 7, 2020, arXiv:2002.04147v2, 18 pages.

Yu et al., "Path-Restore: Learning Network Path Selection for Image Restoration," CoRR, submitted on Jul. 27, 2021, arXiv:1904.10343v2, 15 pages.

Roth et al., "Fields of Experts," International Journal of Computer Vision, Jan. 24, 2009, 25 pages.

Chang et al., "One Network to Solve Them All-Solving Linear Inverse Problems using Deep Projection Models" Proceedings of 2017 IEEE International Conference on Computer Vision (ICCV), Oct. 22-29, 2017, 10 pages.

International Search Report and Written Opinion in International Appln. No. PCT/EP2021/058622, mailed on Dec. 20, 2021, 15 pages.

* cited by examiner

Figure 4

$$G'(s) = G(s) + \epsilon \frac{G(s)}{\max(\|G(s)\|_2, \epsilon)}$$

$$\epsilon = e^\alpha \sigma \sqrt{N_t} - 1$$

Learnable parameter

Number of image pixels

Predicted pixel-based noise standard deviation

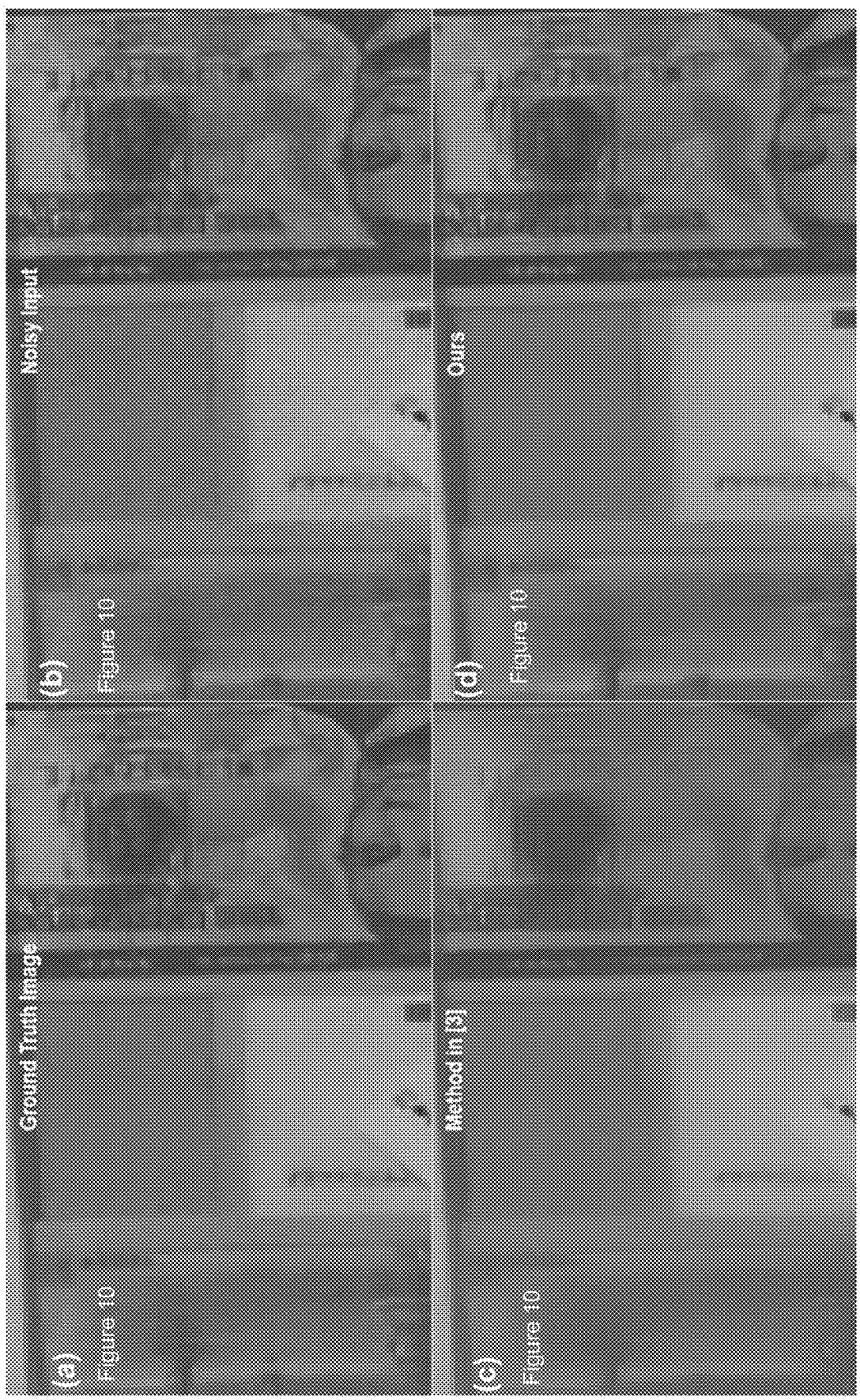

NOISE RECONSTRUCTION FOR IMAGE DENOISING

CROSS-REFERENCE TO RELATED APPLICATIONS

This application is a continuation of International Application No. PCT/EP2021/058622, filed on Apr. 1, 2021, the disclosure of which is hereby incorporated by reference in its entirety.

FIELD OF THE INVENTION

This invention relates to computer vision, in particular to using a deep neural network such as a convolutional neural network (CNN) for image analysis.

BACKGROUND

Image denoising aims to estimate the underlying clean image from its noisy observation and is an important step in many digital imaging and computer vision systems.

FIG. 1(a) shows how the presence of noise can affect image quality. FIG. 1(b) shows the improvement of the image quality achieved by applying an image denoising technique to the noisy image (from Kai Zhang, Wangmeng Zuo, Yunjin Chen, Deyu Meng, and Lei Zhang, "Beyond a Gaussian Denoiser: Residual Learning of Deep CNN for Image Denoising", IEEE Transactions on Image Processing, 2017).

Camera sensors output RAW data in a linear color space, where pixel measurements are proportional to the number of photoelectrons collected. The primary sources of noise are shot noise, a Poisson process with variance equal to the signal level, and read noise, an approximately Gaussian process caused by a variety of sensor readout effects. These effects are well-modelled by a signal-dependent Gaussian distribution:

$$x_p \sim \mathcal{N}(y_p, \sigma_r^2 + \sigma_s y_p) \qquad (1)$$

where $x_p$ is a noisy measurement of the true intensity $y_p$ at pixel p. The noise parameters $\sigma_r$ and $\sigma_s$ are fixed for each image but can vary from image to image as sensor gain (ISO) changes.

However, the noise in real images comes from various sources (for example, dark current noise and thermal noise) and is much more sophisticated. Although the noise in RAW sensor data is relatively well understood, in the RGB domain, the post-processing performed between capture and display (such as demosaicking, sharpening, tone mapping and compression) makes the noise model more complex, which makes the image denoising task more challenging.

For example, by taking the in-camera image processing pipeline into account, the channel-independent noise assumption may not hold true. In general, a realistic noise model as well as the in-camera image processing pipeline are important aspects in training CNN-based denoising methods for real photographs.

Traditional single-image denoising algorithms often analytically model properties of images and the noise they are designed to remove using mathematical tools and models including partial differential equations, sparse coding and low-rank approximation. Most of these methods rely on very limited human knowledge or assumptions about the image prior, limiting their capability in recovering complex image structures. In contrast, modern denoising methods often employ neural networks to learn a mapping from noisy images to noise-free images. Deep learning is capable of representing complex properties of images and noise, but training these models requires large paired datasets. As a result, most learning-based denoising techniques rely on synthetic training data. Recent benchmarks reveal that some deep learning models are often outperformed by traditional, hand-engineered algorithms when evaluated on real noisy images.

By stacking convolution, batch normalization, ReLU layers and adopting the idea of residual learning, the DnCNN approach, described in Kai Zhang, Wangmeng Zuo, Yunjin Chen, Deyu Meng, and Lei Zhang, "Beyond a gaussian denoiser: Residual learning of deep cnn for image denoising", IEEE Transactions on Image Processing, 2017, achieves a much higher PSNR index than conventional state-of-the-art approaches. For the pursuit of highly accurate denoising results, some complex networks have been proposed, such as that described in Ying Tai, Jian Yang, Xiaoming Liu, and Chunyan Xu, "Memnet: A persistent memory network for image restoration", CVPR, 2017.

The Generative Adversarial network (GAN) approach to denoising comprises a generator and a discriminator module commonly optimized with alternating gradient descent methods. The generator samples z from a prior distribution $p_z$, such as a uniform distribution, and tries to model the target distribution $p_d$. The discriminator D aims to distinguish between the samples generated from the model and the target (ground-truth) distributions.

Conditional GAN (cGAN), as described in Mehdi Mirza and Simon Osindero, "Conditional generative adversarial nets", arXiv preprint arXiv:1411.1784, 2014, extends the formulation by providing the generator with additional labels. The generator G typically takes the form of an encoder-decoder network where the encoder projects the label into a low-dimensional latent subspace and the decoder performs the opposite mapping, i.e. from low-dimensional to high-dimensional subspace. If s denotes the conditioning label and y denotes a sample from the target distribution, the adversarial loss is expressed as:

$$\mathcal{L}_{adv}(G,D) = \mathbb{E}_{s, y \sim p_d(s,y)}[\log D(y|s)] + \mathbb{E}_{s \sim p_d(s), z \sim p_z(z)} [\log(1 - D(G(s,z)|s))] \qquad (2)$$

by solving the following min-max problem:

$$\min_{w_G}\max_{w_D} \mathcal{L}_{adv}(G,D) = \min_{w_G}\max_{w_D} \mathbb{E}_{s,y \sim p_d(s,y)}[\log D(y \mid s, w_D)] + \mathbb{E}_{s \sim p_d(s), z \sim p_z(z)}[\log(1 - D(G(s,z \mid w_G) \mid s, w_D))] \qquad (3)$$

where $w_G, w_D$ denote the parameters of the generator and the discriminator respectively. To simplify the notation, the dependencies on the parameters and the noise z have been omitted in the description below.

A method extending the conditional GAN approach is the Robust Conditional GAN (RoCGAN), as described in G. Chrysos et al., "Robust Conditional Generative Adversarial Networks", ICLR, 2019. In RoCGAN, the GAN has a generator and a discriminator module commonly optimized with alternating gradient descent methods. The generator samples from a prior distribution (e.g. uniform) and tries to model the target distribution. The discriminator tries to distinguish between the samples generated from the model and the target (ground-truth) distributions.

In this approach, the generator is augmented with an unsupervised pathway to encourage the outputs of the generator to span the target manifold even in the presence of large amounts of noise. The first pathway, referred to as the reg pathway, performs a similar regression (denoising) as its counterpart in cGAN. It accepts a sample from the source domain (noisy image) and maps it to the target domain (clean image). An additional AE pathway works as an autoencoder in the target domain.

In RoCGAN, the AE pathway contributes the following loss term:

$$\mathcal{L}_{AE} = \sum_{n=1}^{N}[f_d(y^{(n)}, G^{(AE)}(y^{(n)}))] \tag{4}$$

where $f_d$ denotes a divergence metric ($\ell_1$ loss), the superscript 'AE' abbreviates modules of the AE pathway, 'G' modules of the reg pathway and $G^{(AE)}(y^{(n)}) = d^{(AE)}(e^{(AE)}(y^{(n)}))$ is the output of the AE pathway.

Both pathways have the same encoder-decoder networks. By sharing the weights of their decoders, RoCGAN promotes the regression outputs to span the target manifold and not induce arbitrarily large errors. Skip connections can be used in RoCGAN enabling deeper layers to capture more abstract representations without the need of memorizing all the information. The lower level representations are propagated directly to the decoder through the shortcut.

Despite sharing the weights of the encoders, RoCGAN forces the latent representations of the two pathways to span the same space. To further reduce the distance of the two representations in the latent space, a latent loss term $\mathcal{L}_{lat}$ is used. This term minimizes the distance between the encoders' outputs, i.e. the two representations are spatially close (in the subspace spanned by the encoders).

The latent loss term is given by:

$$\mathcal{L}_{lat} = \sum_{n=1}^{N}\|e^{(G)}(s^{(n)}) - e^{(AE)}(y^{(n)})\| \tag{5}$$

The feature matching loss enables the network to match the data and the model's distribution faster. The intuition is that to match the high-dimensional distribution of the data with reg pathway, their projections in lower-dimensional spaces are encouraged to be similar.

The feature matching loss is given by:

$$\mathcal{L}_f = \sum_{n=1}^{N}\|\pi(G(s^{(n)})) - \pi(y^{(n)})\| \tag{6}$$

where $\pi(\,)$ extracts the features from the penultimate layer of the discriminator.

Skip connections can enable deeper layers to capture more abstract representations without the need to memorize all of the information. The lower-level representations are propagated directly to the decoder through the shortcut, which makes it harder to train the longer path, i.e. the network excluding the skip connections. This challenge is implicitly tackled by maximizing the variance captured by the longer path representations. The Decov loss term that penalizes the correlations in the representations (of a layer), and thus implicitly encourages the representations to capture diverse and useful information, is used. This loss may be applied to a single layer or multiple layers in a network, while for the $j^{th}$ layer this loss is defined as:

$$\mathcal{L}_{decov}^{j} = \frac{1}{2}(\|C^j\|_F^2 - \|\text{diag}(C^j)\|_2^2) \tag{7}$$

where diag( ) computes the diagonal elements of a matrix and $C^j$ is the covariance matrix of the $j^{th}$ layer's representations. The loss is minimized when the covariance matrix is diagonal, i.e. it imposes a cost to minimize the covariance of hidden units without restricting the diagonal elements that include the variance of the hidden representations.

By defining $G(s^{(n)}) = d^{(G)}(e^{(G)}(s^{(n)}))$ as the output of the reg pathway, the final loss function of RoCGAN combines the loss terms of the original cGAN with the additional three terms for the AE pathway:

$$\mathcal{L}_{RoCGAN} = \underbrace{\mathcal{L}_{adv} + \lambda_c \cdot \underbrace{\sum_{n=1}^{N}\|G(s^{(n)}) - y^{(n)}\|}_{content-loss} + \lambda_\pi \cdot \mathcal{L}_f +}_{cGAN-loss} \tag{8}$$

$$\lambda_{ae} \cdot \mathcal{L}_{AE} + \lambda_l \cdot \mathcal{L}_{lat} + \lambda_d \cdot \sum_j \mathcal{L}_{decov}^j$$

where $\lambda_c$, $\lambda_\pi$, $\lambda_{ae}$, $\lambda_l$, and $\lambda_d$ are hyper-parameters to balance the loss terms.

This method can be used in image denoising, but was designed for object-dependent image denoising.

The AE pathway is an unsupervised learning method whose hidden layers contain representations of the input data for compressing (and decompressing) the data while losing as little information as possible. However, even in the presence of skip connections, the AE pathway is not capable of reconstructing all natural scenes and patterns. In other words, the use of one autoencoder to define a nonlinear manifold which can accurately reconstruct image patterns from a variety of real complex objects/scenes is not realistic. As a result, previous methods such as RoCGAN very often hallucinate complex image structures by introducing severe blurry effects or unnatural image patterns/artifacts.

The heavy computation and memory footprint of these methods also hinders their application on hardware constrained devices, such as smartphones or consumer electronic products. In addition, these methods try to exploit image priors to better model the clean image; something which is a very complex problem given the variety of all natural image patterns.

The approach described in I. Marras et al., "Reconstructing the Noise Variance Manifold for Image Denoising", ECCV 2020, performs image denoising using reconstructed noise that spans the target image signal-dependent noise manifold. An adversarial neural network is used based on an encoder-decoder generator with two pathway modules and shared decoder parameters. The first pathway acts as a generator, based on residual learning, which performs regression, while the generator is augmented with a second pathway which promotes the generator to remove from the noisy input the residual noise which spans the target image signal-dependent noise manifold. A schematic of the generator is illustrated in FIG. 2. The reg pathway is shown at 201 and the AE pathway at 202.

With over 1.5 billion smartphones sold annually, it is unsurprising that smartphone images now vastly outnumber images captured with DSLR and point-and-shoot cameras. While the prevalence of smartphones makes them a convenient device for photography, their images are typically degraded by higher levels of noise due to the smaller sensors and lenses found in their cameras. This problem has heightened the need for progress in image denoising, particularly in the context of smartphone imagery.

It is desirable to develop an approach to image denoising that overcomes these problems.

SUMMARY OF THE INVENTION

According to a first aspect there is provided an apparatus for denoising an image, the apparatus comprising a processor configured to: receive an input image captured by an image sensor; implement a trained artificial intelligence model to: form an estimate of a noise pattern in the input image; form an estimate of at least one noise statistic for the image sensor that captured the input image; and refine the estimate of the noise pattern in dependence on the estimate of the at least one noise statistic; and form an output image by subtracting the refined estimate of the noise pattern from the input image.

Taking the noise statistic(s) of the sensor that captured the input image into account may result in a denoised image of improved quality.

The model may be configured to refine the estimate of the noise pattern by means of a projection onto a trained noise manifold. Using this approach, meaningful image structures may be better retained through the denoising process, which may enhance the image quality.

The model may be configured to project the estimate of the noise pattern and the at least one noise statistic onto the same trained noise manifold. This may allow noise statistics, such as noise standard deviation information, to be used to correct the statistics of the predicted noise initially estimated by the model.

The at least one noise statistic may comprise the noise variance of the image sensor. The noise variance projection layer of the network may explicitly exploit the noise standard deviation information to correct the statistics of the predicted noise initially estimated by a generator.

The estimate of the noise pattern may be spatially adaptive Gaussian. This may allow the noise estimate to be conveniently estimated.

The apparatus may be configured to receive an indication of the specific image sensor type of the image sensor that captured the input image, wherein the apparatus is configured to provide that indication as an input to the model. Providing an indication of the type of sensor that captured an image to the noise model may result in improved image quality.

The apparatus may comprise an imaging device having the image sensor that captured the input image. The apparatus may be configured to generate the input image using the imaging device and to provide the indication of the specific image sensor type as an input to the model. Providing an indication of the type of sensor that captured an image to the noise model may result in improved image quality.

The model may be configured to estimate the at least one noise statistic in dependence on noise parameters of the image sensor. At least one of the noise parameters may be learnable.

The trained artificial intelligence model may be a neural network. This may be a convenient implementation.

The neural network may comprise an encoder-decoder generator architecture having a first pathway and a second pathway. Augmenting the generator with the second pathway may help to promote the generator to remove from the noisy input the residual noise which spans the target image signal-dependent noise manifold.

The weights of the decoders of the first and second pathways may be shared. By sharing the weights of their decoders, this promotes the regression outputs to span the target manifold and not induce arbitrarily large errors.

The first pathway may be configured to act as a generator which performs regression and is augmented with the second pathway which promotes the generator to subtract the refined estimate of the noise pattern from the input image.

The input image may be an RGB image. The input image may be a RAW image. This may allow the apparatus to be used in devices such as smartphones to remove noise from images captured by the cameras of such devices.

According to a second aspect there is provided a method for denoising an image, the method comprising: receiving an input image captured by an image sensor; implementing a trained artificial intelligence model to: form an estimate of a noise pattern in the input image; form an estimate of at least one noise statistic for the image sensor that captured the input image; and refine the estimate of the noise pattern in dependence on the estimate of the at least one noise statistic; and forming an output image by subtracting the refined estimate of the noise pattern from the input image.

Taking the noise statistic(s) of the sensor that captured the input image into account may result in a denoised image of improved quality.

According to a further aspect there is provided a method for training a model to perform denoising on images, the method comprising: receiving a plurality of input images, each captured by an image sensor; receiving a plurality of noise signatures; receiving at least one noise statistic for the image sensor(s) that captured the plurality of input images; for each of the plurality of input images:
  (i) selecting one of the plurality of noise signatures and applying that noise signature to the input image to form a noisy input image;
  (ii) forming a first noise estimate in the input image and a first estimate of at least one noise statistic for the image sensor that captured the input image by implementing a candidate version of the model on the noisy input image;
  (iii) refining the first noise estimate in dependence on the first estimate of the at least one noise statistic;
  (iv) forming an estimate of the respective input image by subtracting the refined first noise estimate from the noisy input image;
  (v) forming a second noise estimate and a second estimate of at least one noise statistic by implementing the candidate version of the model on the respective input image, the selected noise signature and at least one noise statistic for the image sensor that captured the respective input image; and
  (vi) adapting the candidate version of the model in dependence on (a) a difference between the respective input image and the estimate of the respective input image, (b) a difference between the second noise estimate and the selected noise signature and (c) a difference between the second estimate of at least one noise statistic and the at least one noise statistic for the image sensor that captured the respective input image.

The forming step (ii) may be performed in a first pathway. The forming step (v) may be performed in a second pathway. Augmenting the generator of an image processor with the second pathway promotes the generator to remove from the noisy input the residual noise which spans the target image signal-dependent noise manifold.

Each of the first and second pathways may comprise an encoder-decoder network. The weights of the decoders of the first and second pathways may be shared. By sharing the weights of their decoders, this promotes the regression outputs to span the target manifold and not induce arbitrarily large errors.

The first pathway and the second pathway may each be based on a fully convolutional network. This may be a convenient implementation.

The second pathway may implement an unsupervised learning method. The hidden layers of the unsupervised learning method may contain representations of the input data sufficiently powerful for compressing (and decompressing) the data whilst losing as little information as possible.

The first pathway may comprise one or more skip connections. Skip connections, which can, for example, connect the intermediate layers of the encoder with the corresponding intermediate layers of the decoder, may enforce the network to learn the residual between the features corresponding to the predicted image noise and the actual image noise. This may result in faster convergence.

Each of the plurality of input images may be a RAW image or an RGB image. This may allow the method to be used in devices such as smartphones to remove noise from images captured by the cameras of such devices.

The model may be a convolutional neural network. This may be a convenient implementation.

According to a further aspect there is provided a device for training a model to perform denoising on images, the device having a processor configured to perform the steps of the method described above.

BRIEF DESCRIPTION OF THE FIGURES

The present invention will now be described by way of example with reference to the accompanying drawings. In the drawings:

FIG. 4 schematically illustrates the projection operation in the noise variance projection layer of the network.

FIGS. 10(a)-(d) show denoising results and comparison to a state-of-the-art method. FIG. 10(a) shows the clean ground truth image. FIG. 10(b) shows the noisy RGB input image. FIG. 10(c) shows the denoised image by the method in I. Marras et al., Reconstructing the Noise Variance Manifold for Image Denoising, ECCV 202. FIG. 10(d) shows an example of a denoised image produced using present method.

DETAILED DESCRIPTION OF THE INVENTION

Embodiments of the present invention concern a method for image denoising based on explicitly understanding and exploiting the structure of the noise variance related to an image sensor. In an implementation, the predicted residual image (predicted noise), to be subtracted from the noisy input image, is first corrected to match the noise statistics of the specific image sensor noise characteristics. As a result, meaningful image structures are better retained through the denoising process, enhancing the image quality.

The goal is to perform image denoising by explicitly constraining a generator to remove from the noisy input image generated noise distribution samples where the reconstructed image noise and noise variance spans the target image signal-dependent noise variance manifold.

In an embodiment, a noise variance projection layer explicitly exploits the noise standard deviation information to correct the statistics of the predicted noise initially estimated by a generator.

Figure 1:
FIG. 1(a) shows a noisy image.
FIG. 1(b) shows the improvement of the image quality achieved by applying a known image denoising technique to the noisy image of FIG. 1(a).
Figure 1:
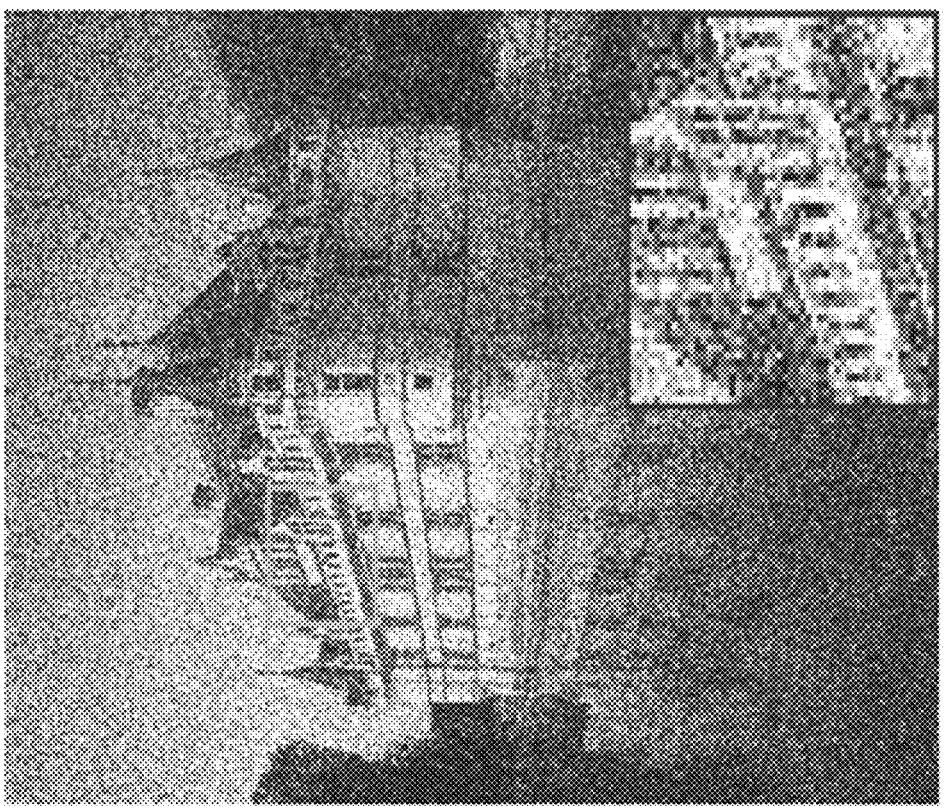
Figure 2:
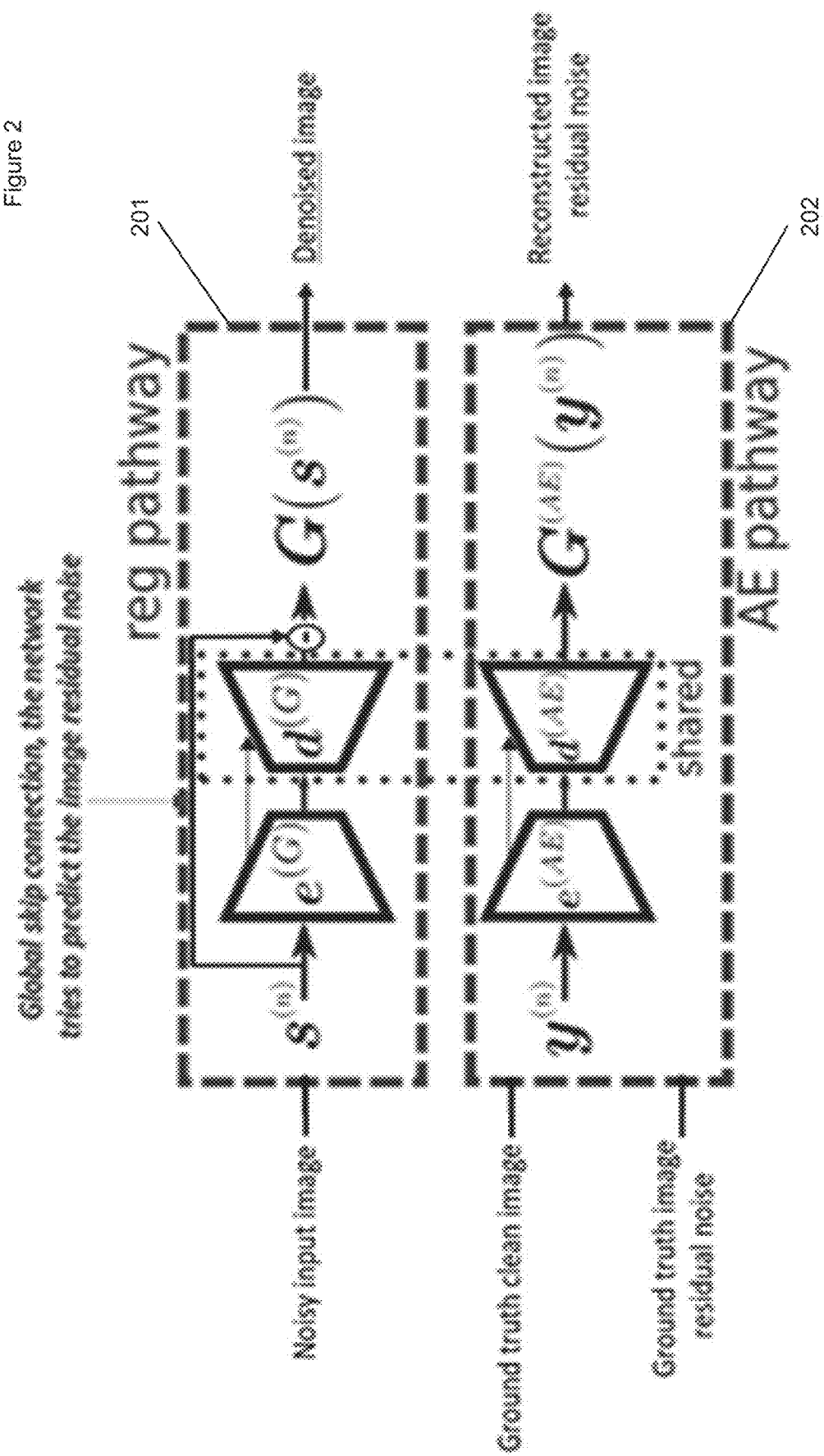
FIG. 2 shows a schematic of the generator of the method described in I. Marras et al., Reconstructing the Noise Variance Manifold for Image Denoising, ECCV 2020.
Figure 3A:
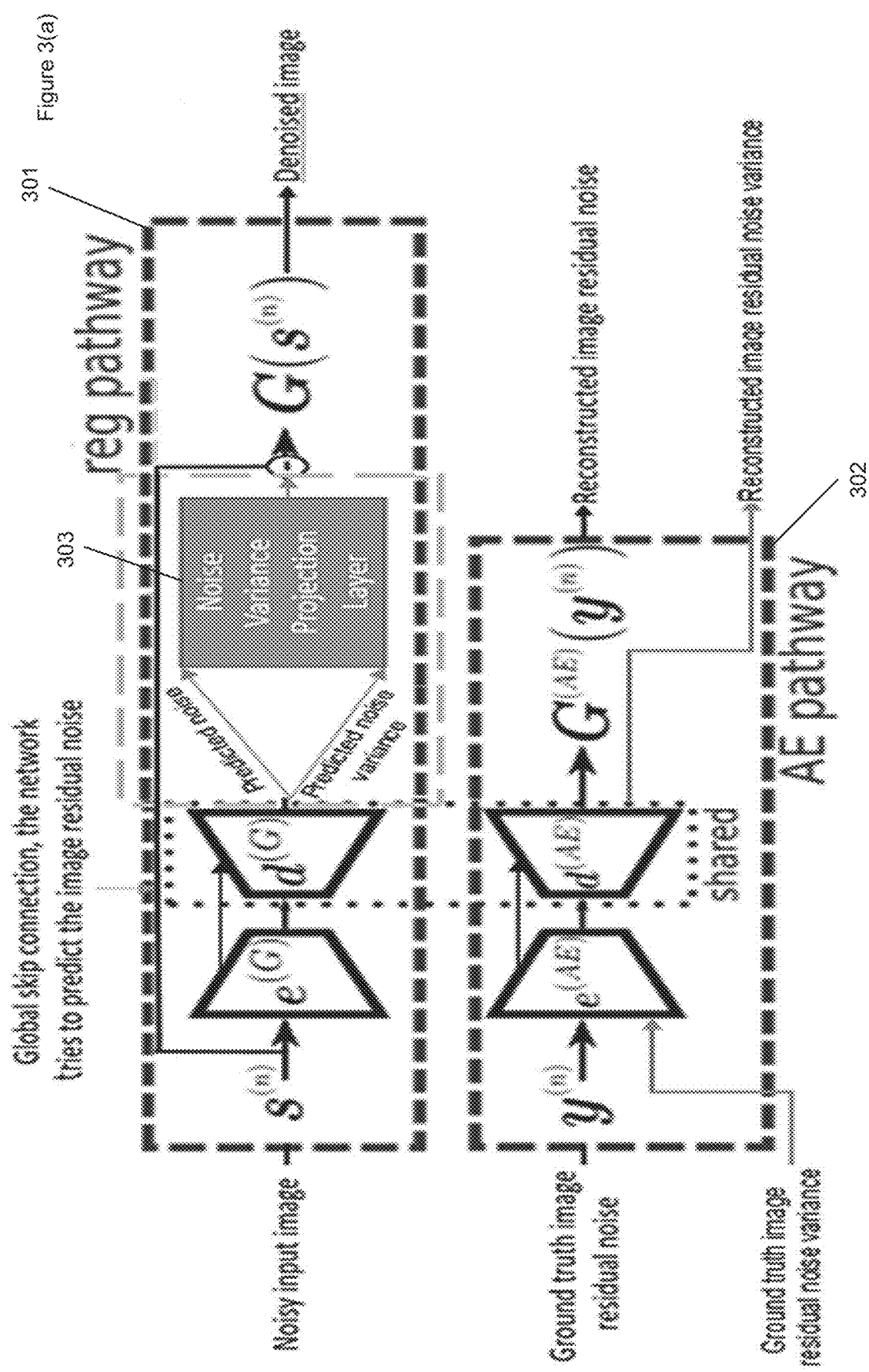
FIG. 3(a) shows a schematic implementation of the generator of the method described herein. For simplicity, the ResNet-type backbone network in the beginning of the reg pathway is omitted.

An embodiment of the CNN design of the generator is schematically illustrated in FIG. 3(a). An adversarial neural network is used based on an encoder-decoder generator with two pathway modules and shared decoder parameters. As illustrated schematically in FIG. 3(a), the generator typically takes the form of an encoder-decoder network where the encoder projects the label into a low-dimensional latent subspace and the decoder performs the opposite mapping, i.e. from low-dimensional to high-dimensional subspace.

The generator comprises a first pathway 301 (herein referred to as the reg pathway) and a second pathway 302 (herein referred to as the AE pathway). Both the reg pathway 301 and AE pathway 302 are based on deep learning and may, for example, apply a CNN to process the input image. A CNN learns a collection of filters, which are applied to the image through convolution. The convolution is designed to be spatially invariant, meaning the convolution has the same effect when applied to any location in the image.

The first pathway 301 acts as generator, based on residual learning, which performs regression. That pathway forces (via projection) the noise statistics of the predicted residual image to obey the statistics of the camera sensor's noise.

The generator is augmented with the second pathway 302, which promotes the generator to remove from the noisy input the residual noise which spans the target image signal-dependent noise manifold, while the noise statistics are close to the estimated noise statistics, for each camera sensor, that span the same manifold.

Figure 3B:
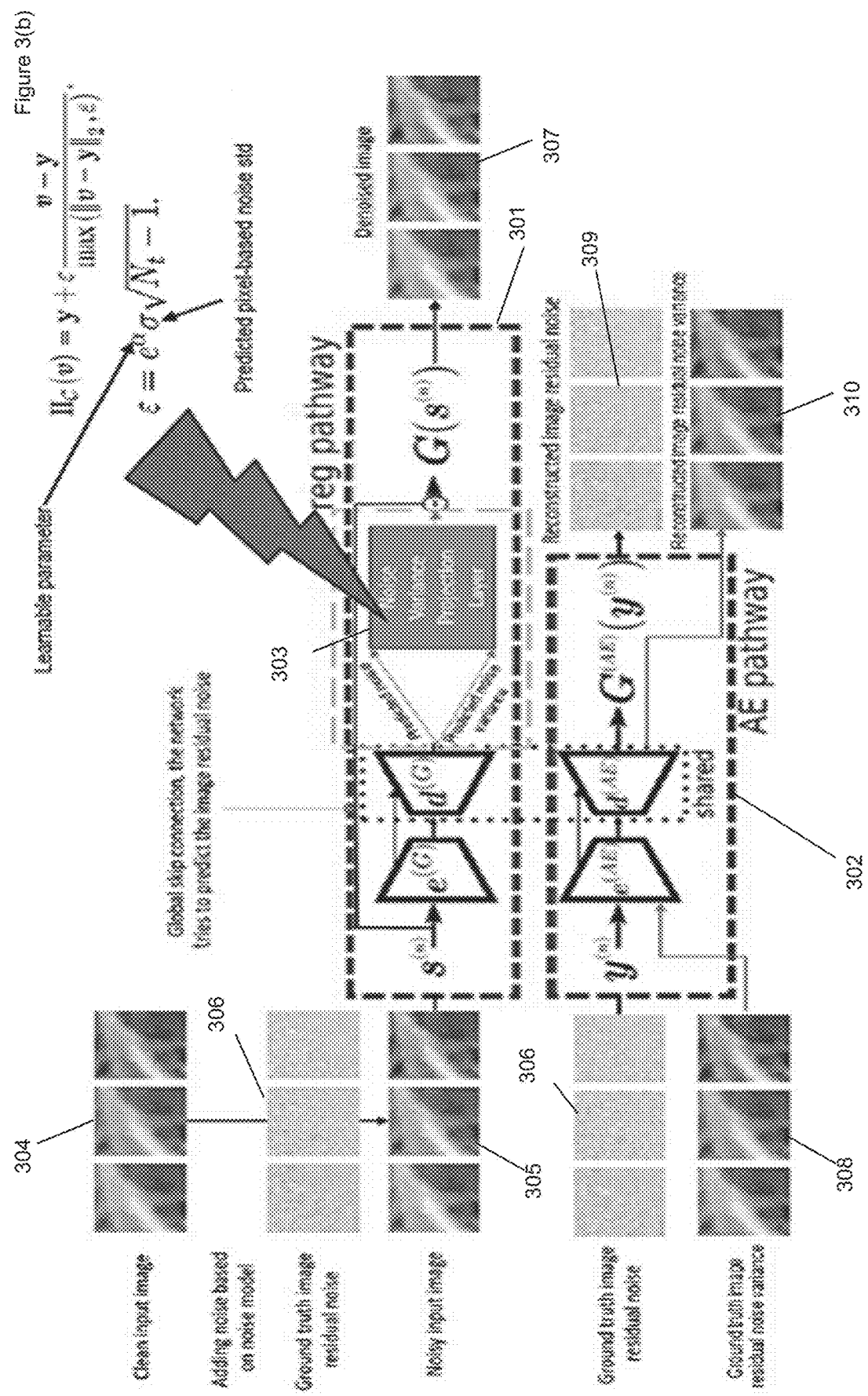
FIG. 3(b) shows a schematic illustration of the training of the network.

In other words, the network can learn how to turn poor images into good images by only looking at the structure of the predicted residual image (predicted noise) which is forced to match the noise statistics of a camera sensor, as shown in FIGS. 3(a) and 3(b). In that way, the task of image denoising becomes easier. Also, by learning explicitly a low dimensional manifold for both the noise source and its standard deviation gives the ability not only to better remove that noise from the image but, in the case of many different kind of noise sources, to combine all of them in the same pipeline.

During training, the AE pathway learns not only how to reconstruct the image noise (residual image) but also how to reconstruct the noise standard deviation.

The manifold of both the image signal-dependent noise and its standard deviation is estimated in order to constrain the generator to remove from the noisy input these generated noise distribution samples where the variance spans the target image signal-dependent noise variance manifold. Thus, the reg pathway implicitly removes the latent clean image with the operations in the hidden layers while at the same time it explicitly corrects the estimated camera sensor-based noise statistics. In other words, the task of the AE pathway is not to learn the underlying structure of a huge variety of complex image patterns, but to learn how image structures are affected by the presence of structured noise and how the noise statistics are defined for each camera sensor.

During training, as illustrated in FIG. 3(b), the network learns the convolutional filters, specifically the filter weights. This is done using training pairs, each comprising a noisy RGB input and a reference clean RGB image, which is used as ground truth (GT). Initially, the convolutional filters are set to random values. As shown in FIG. 3(b), the noisy input image is preferably formed by adding a noise signature (which may be generated from a noise model) to the clean input image.

As mentioned above, the training pairs comprise a reference clean RGB input image y, shown at 304 in FIG. 3(b), which is used as a ground truth (GT) image, and a noisy RGB input image s=y+v, shown at 305, where v is the real (GT) residual image, which is a noise signature of the image, 306. As mentioned above, the noise signatures v, 306, may be generated by a noise model and applied to the respective ground truth input image y, 304, to give the noisy input image s, 305. Initially, the convolutional filters can be set to random values. The noisy RGB input image s, 305, is input into the network, and the network regresses a denoised output image, 307.

During training, the AE pathway 302 learns how to reconstruct the image noise 309 (the residual image) and the noise variance 310.

The second pathway 302 receives the ground truth residual image (noise signature) v, 306, and the ground truth residual noise variance, 308, and outputs a reconstructed ground truth residual image, 309, and noise variance, 310.

The network therefore receives a plurality of training input images 304, each captured by an image sensor, a plurality of noise signatures 306 and the noise statistic for the image sensor(s) that captured the plurality of input images, e.g. 310.

For each training image, a noise signature is applied to the image to form the noisy input image 305. On the reg pathway, a first noise estimate in the input image and a first estimate of a noise statistic for the image sensor that captured the input image are formed by implementing a candidate version of the model on the noisy input image 305. The first noise estimate is refined in dependence on the first estimate of the noise statistic. An estimate of the respective input image is then obtained by subtracting the refined first noise estimate from the noisy input image.

On the AE pathway, a second noise estimate 309 and a second estimate of a noise statistic 310 are formed implementing the candidate version of the model on the respective input image, the selected noise signature and at least one noise statistic for the image sensor that captured the respective input image.

The candidate version of the model is adapted in dependence on a difference between the respective input image 304 and the estimate of the respective input image 307, a difference between the second noise estimate 309 and the noise signature 306 and a difference between the second estimate of the noise statistic 310 and the noise statistic 308 for the image sensor that captured the respective input image.

For example, the difference between the regressed output image 307 and the GT image 304 forms an error, which is then back-propagated through the network from the output to the input though gradients. The weights of the network are then updated to reduce the error.

The training process preferably iterates using a large collection of images until the network weights converge.

Once the network is trained, during inference only the reg pathway 301 is applied to a noisy RGB input image to produce its denoised version.

As described above, the reg pathway 301 takes the noisy RGB image s as input which is then preferably processed by a backbone ResNet model followed by a Unet, as described in Ronneberger, Olaf et al., "U-Net: Convolutional Networks for Biomedical Image Segmentation," Medical Image Computing and Computer-Assisted Intervention (MICCAI), Springer, LNCS, Vol. 9351: 234-241, 2015. The output is the predicted residual image (noise) G(s) which is then removed from the noisy input image to obtain the denoised image.

The first pathway therefore predicts residual noise in the input image and subtracts the predicted residual noise, which is refined in dependence on the noise statistics, from the input image to obtain the denoised image. The first pathway 301 therefore acts as generator, based on residual learning, and performs regression. The generator is augmented with the second pathway 302 which, during training, promotes the generator to remove from the noisy input the residual noise which spans the target image signal-dependent noise manifold.

Therefore, rather than directly outputting the denoised image, the first pathway is designed to predict the ground-truth residual image, i.e., the difference between the noisy observation and the clean (ground truth) image.

The method described above introduces the explicit use of the camera noise statistics to overshoot or undershoot the predicted residual image to match these statistics. To do so, a noise standard deviation projection layer 303 is placed after the generator. The input to this layer 303 is the predicted residual image (predicted image noise) as well as the predicted noise standard deviation.

Rather than directly outputting the denoised image, the first pathway is designed to predict the ground-truth residual image G(s), i.e., the difference between the noisy observation s and the clean (ground-truth) image y. In contrast to RoCGAN, the first pathway also predicts the image standard deviation K(s). G(s) and K(s) are the inputs to the projection layer 303 which forces (via projection) the noise statistics of the G(s) to obey the statistics of the camera sensor's noise. The final residual image estimation is the output of the projection layer, G'(s). This can then be removed from the noisy input image.

In an implementation, the model is configured to estimate the noise statistic in dependence on noise parameters of the image sensor. FIG. 4 depicts the projection operation by the noise variance projection layer 303. The threshold $\varepsilon$ used in the projection layer is parameterized, as depicted in FIG. 4. The threshold $\varepsilon$ is a function of the predicted pixel-based noise standard deviation $\sigma$, the number of image pixels $N_p$, and $\alpha$, which is a learnable parameter.

In some implementations, more than one E can be learned targeting different camera sensors, as well as different image ISO group values. The reg pathway implicitly estimates the latent clean image with the operations in the hidden layers.

The unsupervised pathway 302 works as an autoencoder in the common domain of both the real residual image, v=s−y as well as the real image noise standard deviation b. The input to this pathway is v concatenated with y and b, v⊙y⊙b. In that way, the task of the AE pathway 302 is not to learn how image structures are affected by the presence of structured noise, but how the noise statistics are related to the actual noise. By sharing the weights of their decoders, the generator adopts the residual learning strategy to remove from the noisy observation that image information which spans the common manifold of image noise and image noise standard deviation.

Figure 5:
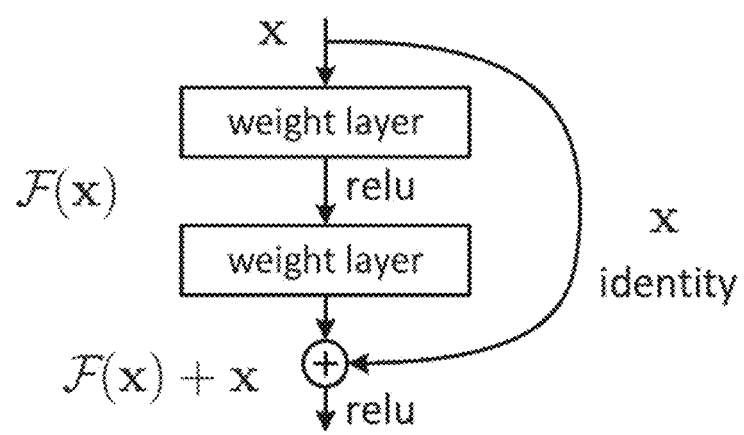
FIG. 5 schematically illustrates the building block used in a backbone residual network (ResNet) (K. He, X. Zhang, S. Ren, and J. Sun, "Deep residual learning for image recognition", IEEE Conference on Computer Vision and Pattern Recognition (CVPR), pages 770-778, 2016).

Noising is a challenging process to be reversed by the few convolutional layers of the encoder in the reg pathway, especially in the object-independent scenario. To that end, a backbone network, may be used prior to the reg pathway to extract complex feature representations useful to preserve later on the low and high image frequencies. As mentioned above, the backbone may be a residual network (ResNet), as described in K. He, X. Zhang, S. Ren, and J. Sun, "Deep residual learning for image recognition", IEEE Conference on Computer Vision and Pattern Recognition (CVPR), pages 770-778, 2016, created by stacking building blocks as depicted in FIG. 5. Therefore, the input to the reg pathway may be features extracted from the input image (for example, in the form of a tensor) rather than the image itself.

The reg pathway therefore preferably takes an RGB image as input which is then processed by a backbone ResNet model followed by a Unet. The output is the predicted residual image (noise) which is then removed from the noisy input image to obtain the denoised image. The Unet uses an encoder-decoder architecture with two lateral Unet style skip connections (shown in more details in FIG. 6, described below). These skip connections, which connect the intermediate layers of the encoder with the corresponding intermediate layers of the decoder, enforce the network to learn the residual between the features corresponding to the predicted image noise and the actual image noise. This has the impact of faster convergence as empirically detected. The AE pathway takes as input the real (groundtruth) residual image and the real (groundtruth) noise standard deviation that are then processed by a Unet similar to that one in the reg pathway. The output is the reconstruction of both the real residual image and the real noise standard deviation.

In the implementation, the discriminator remains the same as in RoCGAN. It accepts the predicted clean image, s−G'(s), along with y as input.

In the implementation, the input is RGB image data. The network may also take RAW images as input.

Both the reg pathway and AE pathway are based on deep learning (for example, using a CNN). Both pathways apply a convolutional neural network to process the RGB image. A CNN learns a collection of filters, which are applied to the image through convolution. The convolution is designed to be spatially invariant, meaning the convolution has the same effect when applied to any location in the image.

Figure 6:
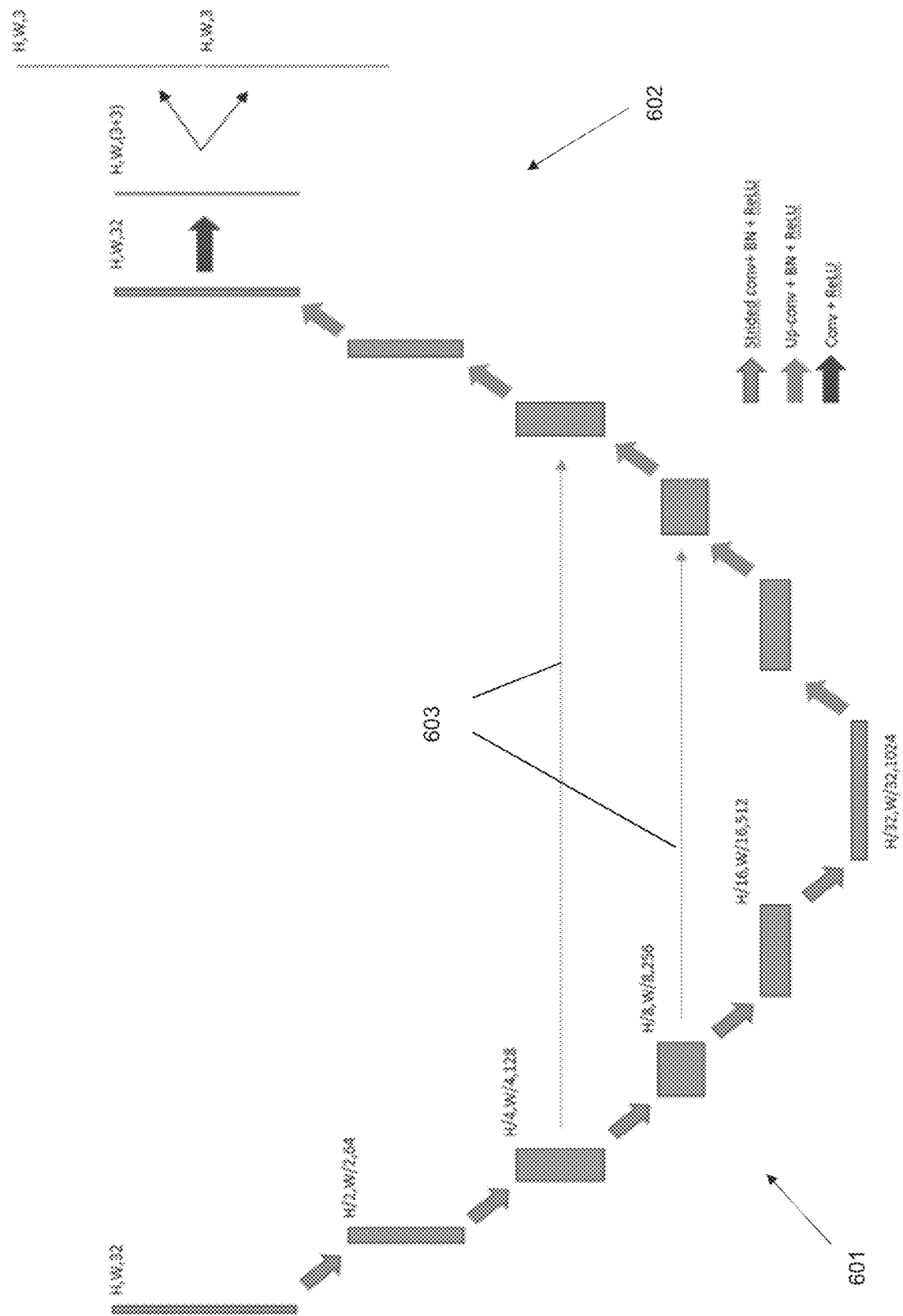
FIG. 6 schematically illustrates an example of the Unet architecture used in the method described herein.

FIG. 6 illustrates an example of the Unet architecture which can be used in the approach described herein. The Unet uses an encoder-decoder architecture with two lateral Unet style skip connections. The encoder part of the network is shown generally at 601, the decoder at 602 and the skip connections are shown at 603. These skip connections, which connect the intermediate layers of the encoder with the corresponding intermediate layers of the decoder, enforce the network to learn the residual between the features corresponding to the predicted image noise and the actual image noise. This has the impact of faster convergence as empirically detected. The AE pathway takes as input the real (groundtruth) residual image which is then processed by a Unet similar to that one in the reg pathway. The output is the reconstruction of the real residual image.

In this example, the encoder part of the network, shown generally at 601, processes the noisy RGB input with six consecutive layers. Each layer applies to its input a strided convolutional with 3×3 convolutional filters (together with a ReLU activation function and batch normalization). The strided convolution increases the number of filters (i.e. channels) by a factor of two, while at the same time it reduces the spatial image resolution by a factor of two (i.e. from H, W, C to H/2, W/2, C). The image is processed at multiple scales and the network adapts to different frequency content. This produces output channels that capture features inherent in the data and relevant to the RGB image denoising task.

The decoder part of the network, shown generally at 602, processes the output of the encoder with five consecutive layers of a Transposed Convolution operation with 3×3 convolutional filters (together with a ReLU activation function and batch normalization). The Transposed Convolution is an upsampling layer which increases the spatial resolution by a factor of two in each dimension (width and height) and decreases the number of filters by a factor of two.

The skip connections, shown at 603 in FIG. 6, may enable deeper layers to capture more abstract representations without the need to memorize all of the information. The lower level representations are propagated directly to the decoder through the shortcut. In the case of layers with a Unet style skip connection, the input to each of these decoder layers is a concatenation of i) the high resolution features from the encoding part related to the same spatial resolution and ii) the output of the previous decoding layer (i.e. spatially upsampled features). The subsequent convolution learns to assemble a more precise output based on the concatenated input. The input to each of the rest of the decoder layers is only the output of the previous decoding layer.

By sharing the weights of their decoders, the generator adopts the residual learning strategy to remove from the noisy observation that image information which spans the image noise manifold.

In the implementation, the reg pathway and the AE pathway comprise fully convolutional networks.

Figure 7:
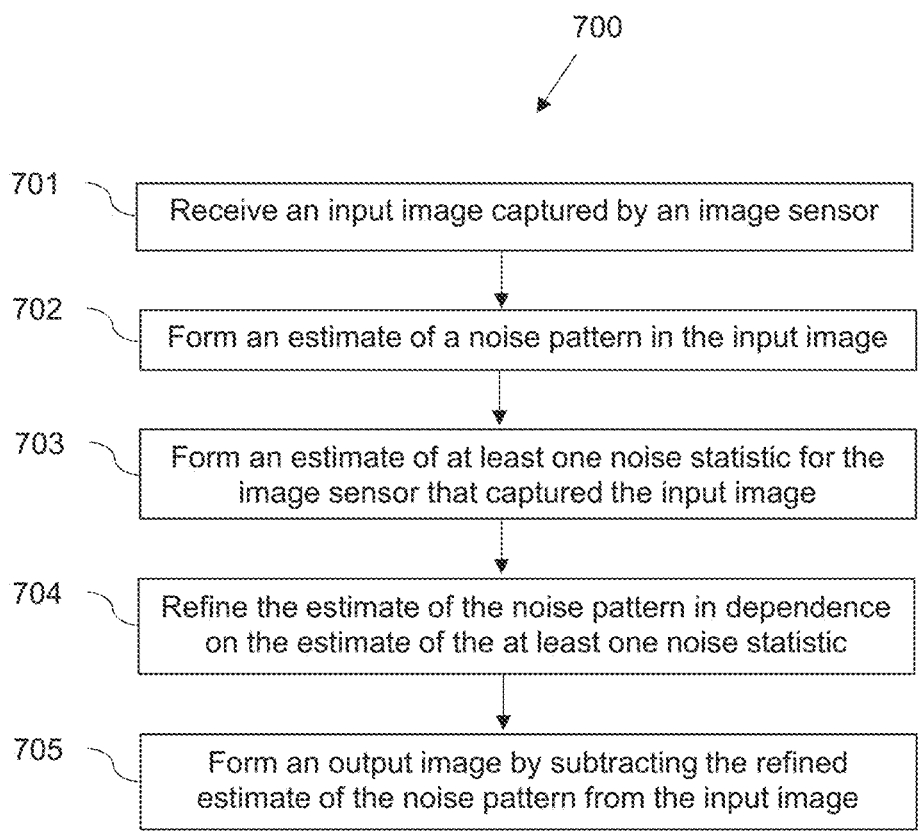
FIG. 7 shows a summary of an example of a method for denoising an image.

FIG. 7 summarises a method 700 for denoising an image that can be implemented using the network and apparatus described herein. At step 701, the method comprises receiving an input image captured by an image sensor. The method comprises implementing a trained artificial intelligence model to perform the steps 702-704. At step 702, the method comprises forming an estimate of a noise pattern in the input image. At step 703, the method comprises forming an estimate of at least one noise statistic for the image sensor that captured the input image. At step 704, the method comprises refining the estimate of the noise pattern in dependence on the estimate of the at least one noise statistic. At step 705, the method comprises forming an output image by subtracting the refined estimate of the noise pattern from the input image.

Figure 8:
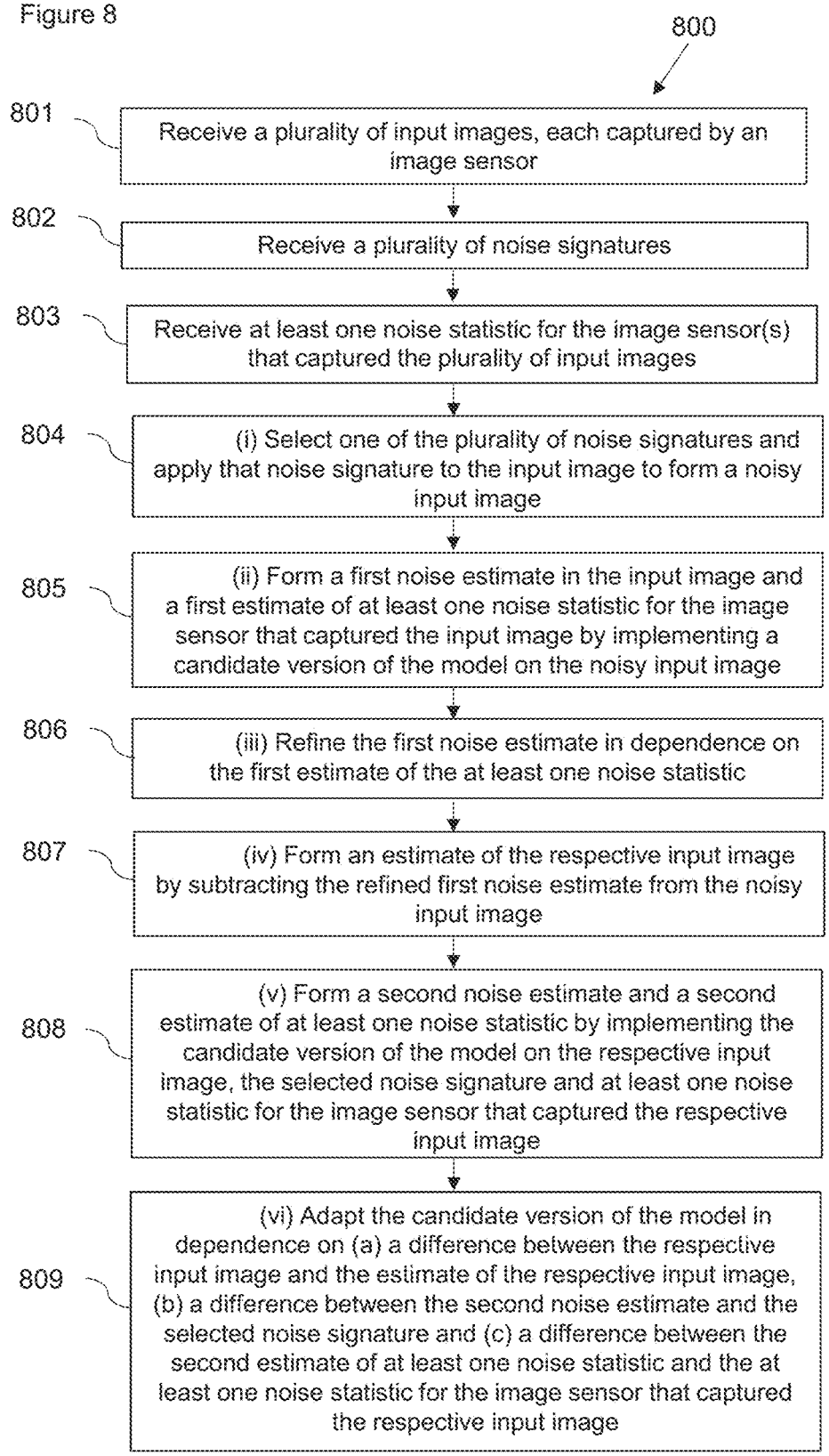
FIG. 8 shows a summary of an example of a method for training a model to perform denoising on images.

FIG. 8 summarises a method 800 for training a model to perform denoising on images. At step 801, the method comprises receiving a plurality of input images, each captured by an image sensor, receiving a plurality of noise signatures; receiving at least one noise statistic for the image sensor(s) that captured the plurality of input images; for each of the plurality of input images:

(i) selecting one of the plurality of noise signatures and applying that noise signature to the input image to form a noisy input image;
(ii) forming a first noise estimate in the input image and a first estimate of at least one noise statistic for the image sensor that captured the input image by implementing a candidate version of the model on the noisy input image;
(iii) refining the first noise estimate in dependence on the first estimate of the at least one noise statistic;
(iv) forming an estimate of the respective input image by subtracting the refined first noise estimate from the noisy input image;
(v) forming a second noise estimate and a second estimate of at least one noise statistic by implementing the candidate version of the model on the respective input image, the selected noise signature and at least one noise statistic for the image sensor that captured the respective input image; and
(vi) adapting the candidate version of the model in dependence on (a) a difference between the respective input image and the estimate of the respective input image, (b) a difference between the second noise estimate and the selected noise signature and (c) a difference between the second estimate of at least one noise statistic and the at least one noise statistic for the image sensor that captured the respective input image.

Figure 9:
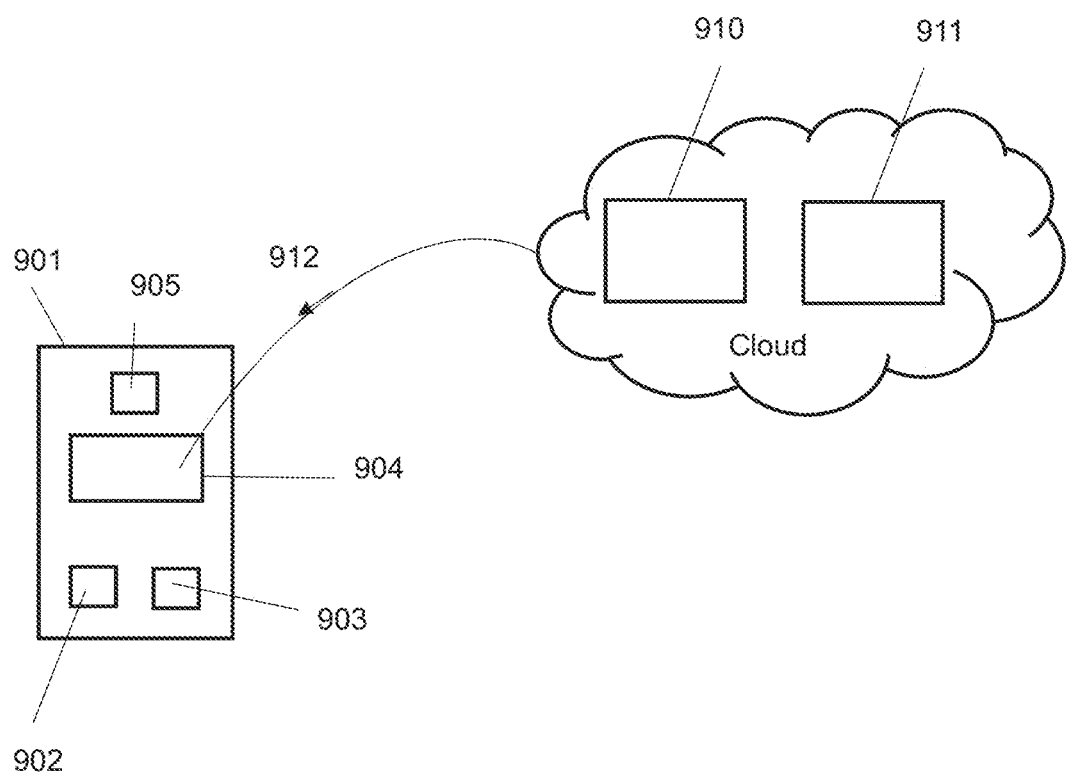
FIG. 9 shows an example of a camera configured to implement the apparatus and methods described herein.

FIG. 9 shows an example of an architecture including a camera that can implement the method described above. A camera 901 is connected to a communications network. Camera 901 comprises an image sensor 902. The camera also comprises a memory 903, a processor 904 and a transceiver 905. The memory stores in non-transient form code that can be run by the processor 904. In some implementations, that code may include a trained artificial intelligence model as described above. The model may include code that is directly executable by the processor and/or parameters such as neural network weightings which are not directly executable instructions but serve to configure other executable code that is stored in the memory 903. The transceiver 705 may be capable of transmitting and receiving data over either or both of wired and wireless communication channels. For example, it may support Ethernet, IEEE 802.11B and/or a cellular protocol such as 4G or 5G.

Such a camera 901 typically includes some onboard processing capability. This could be provided by the processor 904. The processor 904 could also be used for the essential functions of the device.

The transceiver 905 is capable of communicating over a network with other entities 910, 911. Those entities may be physically remote from the camera 901. The network may be a publicly accessible network such as the internet. The entities 910, 911 may be based in the cloud. Entity 910 is a computing entity. Entity 911 is a command and control entity. These entities are logical entities. In practice they may each be provided by one or more physical devices such as servers and datastores, and the functions of two or more of the entities may be provided by a single physical device. Each physical device implementing an entity comprises a processor and a memory. The devices may also comprise a transceiver for transmitting and receiving data to and from the transceiver 905 of camera 901. The memory stores in a non-transient way code that is executable by the processor to implement the respective entity in the manner described herein.

The command and control entity 911 may train the model. This is typically a computationally intensive task, even though the resulting model may be efficiently described, so it may be efficient for the development of the model to be performed in the cloud, where it can be anticipated that significant energy and computing resource is available. It can be anticipated that this is more efficient than forming such a model at a typical camera.

In one implementation, once the model has been developed in the cloud, the command and control entity can automatically form a corresponding model and cause it to be transmitted to the relevant camera device. In this example, denoising is performed at the camera 901 by processor 904.

In another possible implementation, an image may be captured by the camera sensor 902 and the image data may be sent by the transceiver 905 to the cloud for processing. The resulting denoised image could then be sent back to the camera 901, as shown at 912 in FIG. 9.

Therefore, the method may be deployed in multiple ways; for example in the cloud, on the device, or alternatively in dedicated hardware. As indicated above, the cloud facility could perform training to develop new models or refine existing ones. Depending on the compute capability near to the data corpus, the training could either be undertaken close to the source data, or could be undertaken in the cloud, e.g. using an inference engine.

The camera 901 may implement, on the input image, the trained model so as to form a noise estimate in the image and to subtract the noise estimate from the input image to form a reduced-noise output image. The camera may perform a method comprising the following steps: receiving an input image captured by an image sensor; implementing a trained artificial intelligence model to: form an estimate of a noise pattern in the input image; form an estimate of at least one noise statistic for the image sensor that captured the input image; and refine the estimate of the noise pattern in dependence on the estimate of the at least one noise statistic; and forming an output image by subtracting the refined estimate of the noise pattern from the input image.

Embodiments of the methods described herein have many advantages.

For the AE pathway, the reconstruction of both the true image noise and the noise standard deviation based on the same low-dimensional manifold allows for a better understanding of the camera sensor noise statistics. In other words, it can be learned how to turn bad images into good images by only looking at the structure of the predicted residual image, which is forced to match the noise statistics of a camera sensor. This property makes the method feasible to adapt to different camera sensors and different image ISO values and helps the denoiser to avoid in great degree the image over-smoothing.

The noise variance projection layer explicitly gives the ability to any denoiser to adjust the level of denoising according to the ISO value the image has and the camera sensor used to capture that image.

In the case of multi-source image noise, more than one AE pathway can be employed. In this case, each pathway is responsible for removing noise information that comes from a specific noise source with specific noise statistics.

Using the method described herein, it is easier to adapt an existed trained model to a new camera sensor (domain transfer). To do so, the AE pathway must be retrained, but the reg pathway needs only to be fine-tuned using a small number of paired training samples obtained using the new sensor.

By learning to constrain the residual image noise variance, the task of denoising becomes easier compared to RoCGAN or the method in I. Marras et al., "Reconstructing the Noise Variance Manifold for Image Denoising", ECCV, 2020.

For RoCGAN, there is not an explicit way to make sure that the statistics of the noise that is predicted by the generator match the expected noise statistics of the camera sensor. In this way, the network cannot explicitly understand that in images with small ISO values the estimated noise standard deviation should be significant less than in the case of high ISO values. Because of that, in many cases the denoiser destroys the image high frequency details especially for low ISO images. Having different models for different ISO groups makes it not suitable for digital devices with limited resources (such as smartphones) where the run-time performance is of importance.

In RoCGAN, the AE pathway, is an unsupervised learning method whose (hidden) layers contain representations of the input data sufficiently powerful for compressing (and decompressing) the data while losing as little information as possible. The AE pathway directly reconstructs the image noise, but not the noise statistics. In other words, the use of one autoencoder to define a nonlinear manifold which can accurately reconstruct image noise cannot ensure that the noise standard deviation of the predicted noise is (close to) the right one. Given a specific camera sensor for example, there is a maximum value of the standard deviation given an image. It is therefore difficult to make sure the network of RoCGAN can adapt to different camera sensors and different ISO values. As a result, RoCGAN often hallucinates complex image structures by introducing severe blurry effects or weird image patterns/artifacts. Using the method described herein may result in improved image quality compared to denoised images produced using RoCGAN and other prior methods.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus for denoising an image, comprising:
   at least one processor; and
   at least one memory coupled to the at least one processor and storing programming instructions for execution by the at least one processor to:
   receive an input image captured by an image sensor;
   implement a trained artificial intelligence model to:
      form an estimate of a noise pattern in the input image;
      form an estimate of at least one noise statistic for the image sensor; and
      refine the estimate of the noise pattern based on the estimate of the at least one noise statistic; and
   form an output image by subtracting the refined estimate of the noise pattern from the input image; and
   wherein the trained artificial intelligence model is configured to refine the estimate of the noise pattern by projecting the estimate of the noise pattern onto a trained noise manifold.

2. The apparatus as claimed in claim 1, wherein the trained artificial intelligence model is configured to project the estimate of the noise pattern and the at least one noise statistic onto the same trained noise manifold.

3. The apparatus as claimed in claim 1, wherein the at least one noise statistic comprises a noise variance of the image sensor.

4. The apparatus as claimed in claim 1, wherein the estimate of the noise pattern is spatially adaptive Gaussian.

5. The apparatus as claimed in claim 1, wherein the programming instructions are for execution by the at least one processor to receive an indication of a specific image sensor type of the image sensor, and provide that indication as an input to the trained artificial intelligence model.

6. The apparatus as claimed in claim 5, wherein the apparatus comprises an imaging device having the image sensor, and wherein the programming instructions are for execution by the at least one processor to generate the input image using the imaging device and to provide the indication of the specific image sensor type as an input to the trained artificial intelligence model.

7. The apparatus as claimed in claim 1, wherein the trained artificial intelligence model is configured to estimate the at least one noise statistic based on noise parameters of the image sensor.

8. The apparatus as claimed in claim 7, wherein at least one of the noise parameters is learnable.

9. The apparatus as claimed in claim 1, wherein the trained artificial intelligence model is a neural network.

10. A method comprising:
   training a model for denoising images, wherein training the model comprises:
      receiving a plurality of input images captured by an image sensor;
      receiving a plurality of noise signatures;
      receiving at least one noise statistic for the image sensor; and
      for each input image of the plurality of input images:
         selecting one of the plurality of noise signatures and applying that noise signature to the input image to form a noisy input image;
         forming a first noise estimate in the input image and a first estimate of at least one noise statistic for the image sensor by implementing a candidate version of the model on the noisy input image;
         refining the first noise estimate based on the first estimate of the at least one noise statistic;
         forming an estimate of the respective input image by subtracting the refined first noise estimate from the noisy input image;
         forming a second noise estimate and a second estimate of at least one noise statistic by implementing the candidate version of the model on the respective input image, the selected noise signature, and at least one noise statistic for the image sensor; and
         adapting the candidate version of the model based on a difference between the respective input image and the estimate of the respective input image, a difference between the second noise estimate and the selected noise signature, and a difference between the second estimate of at least one noise statistic and the at least one noise statistic for the image sensor; and receiving an image captured by the image sensor; and generating a denoised image by inputting the image into a trained model.

11. The method as claimed in claim 10, wherein forming the first noise estimate is performed in a first pathway and forming the second noise estimate is performed in a second pathway.

12. The method as claimed in claim 11, wherein each of the first and second pathways comprises an encoder-decoder network.

13. The method as claimed in claim 12, wherein weights of decoders of the first and second pathways are shared.

14. The method as claimed in claim 11, wherein the first pathway and the second pathway are each based on a fully convolutional network.

15. The method as claimed in claim 11, wherein the second pathway implements an unsupervised learning method.

16. The method as claimed in claim 11, wherein the first pathway comprises one or more skip connections.

17. The method as claimed in claim 10, wherein each of the plurality of input images is a RAW image or an RGB image.

18. The method as claimed in claim 10, wherein the model is a convolutional neural network.

19. A device, comprising:
at least one processor; and
at least one memory coupled to the at least one processor and storing programming instructions for execution by the at least one processor to:
train a model for denoising images, wherein training the model comprises:
receiving a plurality of input images captured by an image sensor;
receiving a plurality of noise signatures;
receiving at least one noise statistic for the image sensor; and
for each input image of the plurality of input images:
selecting one of the plurality of noise signatures and applying that noise signature to the input image to form a noisy input image;
forming a first noise estimate in the input image and a first estimate of at least one noise statistic for the image sensor by implementing a candidate version of the model on the noisy input image;
refining the first noise estimate based on the first estimate of the at least one noise statistic;
forming an estimate of the respective input image by subtracting the refined first noise estimate from the noisy input image;
forming a second noise estimate and a second estimate of at least one noise statistic by implementing the candidate version of the model on the respective input image, the selected noise signature, and at least one noise statistic for the image sensor; and
adapting the candidate version of the model based on a difference between the respective input image and the estimate of the respective input image, a difference between the second noise estimate and the selected noise signature, and a difference between the second estimate of at least one noise statistic and the at least one noise statistic for the image sensor; and
receive an image captured by the image sensor; and
generate a denoised image by inputting the image into a trained model.

20. The device as claimed in claim 19, wherein the model is a convolutional neural network.

* * * * *